United States Patent [19]

Purves et al.

[11] Patent Number: 5,211,981
[45] Date of Patent: May 18, 1993

[54] PROCESS FOR MAKING A UNIFORM LIQUID, POURABLE SHORTENING CONTAINING HIGH EMULSIFIER LEVELS

[75] Inventors: Edward R. Purves, Forest Park; Larry D. Halstead, Hamilton; Keith D. Adams, Cincinnati, all of Ohio

[73] Assignee: The Procter & Gamble Company, Cincinnati, Ohio

[21] Appl. No.: 956,439

[22] Filed: Oct. 2, 1992

Related U.S. Application Data

[63] Continuation of Ser. No. 714,482, Jun. 13, 1991, abandoned.

[51] Int. Cl.$^5$ .............................................. A23D 9/04
[52] U.S. Cl. .................................. 426/606; 426/417; 426/601
[58] Field of Search ........................ 426/606, 601, 417

[56] References Cited

U.S. PATENT DOCUMENTS

| | | | |
|---|---|---|---|
| 2,815,285 | 12/1957 | Holman et al. | 99/118 |
| 2,815,286 | 12/1957 | Andre et al. | 99/118 |
| 2,999,022 | 9/1961 | Payne et al. | 99/118 |
| 3,011,896 | 12/1961 | Eber et al. | 99/118 |
| 3,097,098 | 7/1962 | Allen et al. | 99/123 |
| 3,145,110 | 8/1964 | Abbott | 99/123 |
| 3,234,029 | 2/1966 | Bruce | 99/123 |
| 3,325,292 | 7/1967 | Endres et al. | 99/118 |
| 3,455,699 | 7/1969 | Bell et al. | 99/118 |
| 3,528,823 | 9/1970 | Rossen | 99/118 |
| 3,549,383 | 12/1970 | Menzies | 99/92 |
| 3,563,766 | 2/1971 | Matsui et al. | 99/118 |
| 3,943,259 | 3/1976 | Norris | 426/24 |
| 4,234,606 | 11/1980 | Gawrilow | 426/24 |
| 4,335,157 | 7/1982 | Varvil | 426/606 |
| 4,391,838 | 7/1983 | Pate | 426/606 |

FOREIGN PATENT DOCUMENTS 53-69842 6/1978 Japan .

OTHER PUBLICATIONS

S. Matz, Ingredients For Bakers, Pan-Tech International, pp. 88-91 (1987).

*Primary Examiner*—Joseph Golian
*Assistant Examiner*—Evan Federman
*Attorney, Agent, or Firm*—Gary M. Sutter; Ronald L. Hemingway

[57] ABSTRACT

A process for making a uniform liquid, pourable shortening involves preparing a melted base oil containing partially hydrogenated oil and optionally highly hydrogenated oil, then blending a melted emulsifier containing at least 30% monoglyceride with the base oil so that the monoglyceride content of the total blend is 10% to 16%. The amounts of emulsifier and highly hydrogenated oil are chosen so that they fall within the crosshatched area EFGD in FIG. 1. The melted blend is rapidly cooled and partially crystallized in a first zone, and then worked by agitation in a second zone. The product shortening has the following solid fat index: 3-12 at 50° F., 0-7 at 70° F., 0-4 at 80° F., 0-3 at 92° F., and not more than 3 at 104° F.

21 Claims, 1 Drawing Sheet

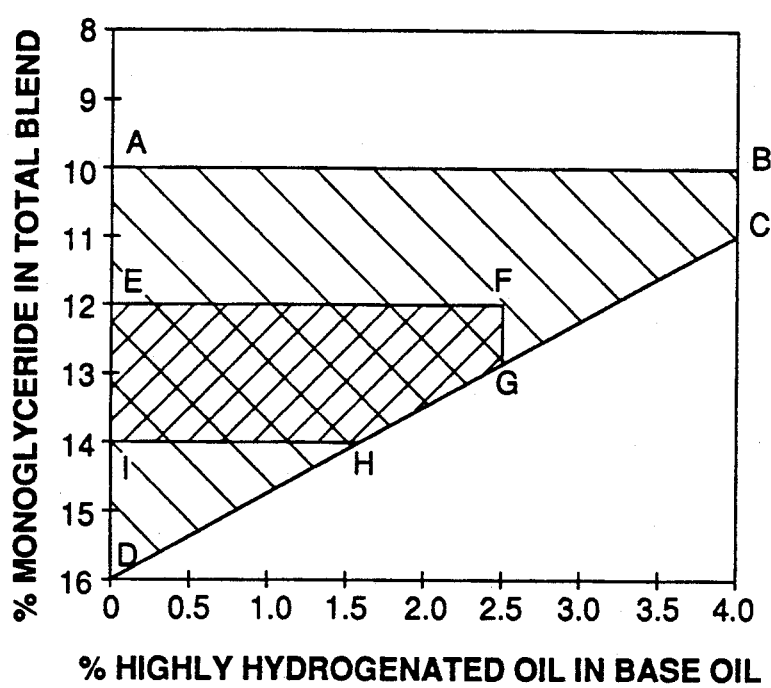

PROCESS FOR MAKING A UNIFORM LIQUID, POURABLE SHORTENING CONTAINING HIGH EMULSIFIER LEVELS

This is a continuation of copending application Ser. No. 07/714,482, filed Jun. 13, 1991, now abandoned.

TECHNICAL FIELD

The present invention relates to a process and composition for making liquid shortenings, in particular for making uniform liquid, pourable shortenings that contain high levels of emulsifier.

BACKGROUND OF THE INVENTION

Conventional liquid or "fluid" shortenings contain about 10% or less emulsifier by weight of the shortening. Liquid shortenings to which very high levels of emulsifier are added have not been made.

It has now been unexpectedly discovered that liquid shortenings containing high levels of mono-diglyceride emulsifier (in the range of 20% to 32% emulsifier by weight of the shortening) are particularly suited for making an improved pizza dough. The dough is more storage stable, handles better, and provides a better baked texture.

Unfortunately, there are several problems associated with adding these high emulsifier levels to a liquid shortening. We have found that if the shortening is made incorrectly, it is not pourable, not uniform, and does not provide the pizza dough improvement benefits.

Therefore, it is an object of the present invention to provide a particular liquid shortening composition that contains high emulsifier levels and is pourable, uniform, and makes an improved pizza dough.

It is also an object of the present invention to provide a particular process which, when combined with the composition, produces the desired liquid shortening.

These and other objects of the invention will be more fully described herein.

All percentages used herein are by weight unless otherwise defined.

SUMMARY OF THE INVENTION

A process and composition for making a uniform liquid, pourable shortening involves preparing a melted base oil containing partially hydrogenated oil and optionally highly hydrogenated oil, then blending a melted emulsifier containing at least 30% monoglyceride with the base oil so that the monoglyceride content of the total blend is 10% to 16%. The amounts of emulsifier and highly hydrogenated oil are chosen so that they fall within the cross-hatched area ABCD in FIG. 1. The melted blend is rapidly cooled and partially crystallized in a first zone, and then worked by agitation in a second zone. The product shortening has the following solid fat index: 3–12 at 50° F., 0–7 at 70° F., 0–4 at 80° F., 0–3 at 92° F., and not more than 3 at 104° F.

BRIEF DESCRIPTION OF THE DRAWING

In FIG. 1, the cross-hatched area ABCD covers the combinations of monoglyceride and highly hydrogenated oil that are acceptable to make a shortening according to the present invention. By "area ABCD" is meant the area bordered by lines AB, BC, CD and DA between points A, B, C and D. The double cross-hatched area EFGHI covers the most preferred combinations of monoglyceride and highly hydrogenated oil.

DETAILED DESCRIPTION OF THE INVENTION

This invention is a process and composition for making a uniform liquid, pourable shortening containing high levels of emulsifier. The shortening product is convenient to use because it is easily pourable and pumpable. Further, the shortening is very uniform, having substantially the same composition from batch to batch and within a batch. It has been discovered that the shortening is particularly suited for making an excellent quality pizza dough. The shortening is easily blended with the pizza dough components such as flour, salt, water and yeast. Moreover, the shortening yields a longer lasting pizza dough, provides dough handling benefits, and provides an overall higher quality baked pizza dough. (The pizza dough per se is not claimed as part of the present invention.)

The process for making the shortening of the invention comprises:

(a) preparing a melted base oil comprising between about 96% and 100% melted partially hydrogenated edible oil having an iodine value between about 90 and about 133, and between 0% and about 4% melted highly hydrogenated edible oil having an iodine value of not more than about 8; then (b) blending a melted emulsifier containing at least about 30% monoglyceride with the melted base oil in proportions so that the monoglyceride content of the total blend is between about 10% and about 16%:

(c) wherein the amounts of emulsifier and highly hydrogenated oil are chosen so that a plot of percent monoglyceride versus percent highly hydrogenated oil falls within the cross-hatched area ABCD in FIG. 1; then (d) in a first zone, rapidly cooling the melted total blend to a temperature between about 60° F. and about 80° F. to partially crystallize the blend; and then (e) in a second zone, working by agitation the partially crystallized total blend to further promote the formation of many small crystals and a liquid pourable shortening: wherein the product shortening has a solid fat index between about and about 12 at 50° F., between 0 and about 7 at 70° F., between 0 and about 4 at 80° F., between 0 and about 3 at 92° F., and not more than about 3 at 104° F.

Composition

The partially hydrogenated edible oil and the highly hydrogenated edible oil can be derived from animal, vegetable or marine sources. Preferred partially hydrogenated oils include soybean oil, corn oil, cottonseed oil, canola oil, sunflower oil, and mixtures thereof. Soybean oil is most preferred for use as both the partially hydrogenated oil and the highly hydrogenated oil. The partially hydrogenated oil has an iodine value between about 90 and about 133, preferably between about 98 and about 120, more preferably between about 100 and 115, and most preferably about 107. The highly hydrogenated oil (which is commonly called a "hardstock") has an iodine value of not more than about 8, and preferably an iodine value of about 8. Iodine value is measured by the standard Wijs Method, which is A.O.C.S. Official Method Cd 1-25 (1989).

The melted base oil comprises a blend of between about 96% and 100% melted partially hydrogenated oil and between 0% and about 4% melted highly hydrogenated oil. Mixtures of different partially hydrogenated oils and highly hydrogenated oils can be used to make up these percentages. Preferably the base oil comprises between about 97.5% and 100% partially hydrogenated oil and between 0% and about 2.5% highly hydrogenated oil, and most preferably 100% partially hydrogenated oil and 0% highly hydrogenated oil.

A melted emulsifier (or mixtures of emulsifiers) containing at least about 30% monoglyceride is blended with the base oil in proportions so that the monoglyceride content of the total blend (the partially hydrogenated oil plus any highly hydrogenated oil plus the emulsifier) is between about 10% and about 16%, preferably between about 12% and about 14%, and most preferably about 13%.

A preferred emulsifier is a mono-diglyceride containing between about 30% and about 70% monoglyceride. More preferably the emulsifier is a mono-diglyceride containing between about 40% and about 60% monoglyceride, between about 32% and about 52% diglyceride and not more than about 16% triglyceride, and most preferably about 50% monoglyceride, about 42% diglyceride and about 8% triglyceride. When such a mono-diglyceride emulsifier is used, the total blend (partially hydrogenated oil plus any highly hydrogenated oil plus emulsifier) preferably contains between about 68% and about 80% base oil (partially hydrogenated oil plus any highly hydrogenated oil) and between about 20% and about 32% emulsifier. More preferably the total blend contains between about 72% and about 76% base oil and between about 24% and about 28% emulsifier, and most preferably about 74% base oil and about 26% emulsifier. These high levels of emulsifier are in contrast to the levels of about 10% or less found in conventional liquid shortenings.

Emulsifiers prepared from a soft base oil (not from a hardstock) are preferred for use in the present invention because they provide the most desired solid fat index in the shortening product. The iodine value of the emulsifier is preferably between about 60 and about 85, and more preferably between about 70 and about 75. A mono-diglyceride emulsifier containing about 50% monoglyceride, about 42% diglyceride, and about 8% triglyceride, and having an iodine value between 70 and 75, can be purchased from Van Den Bergh Co., Lisle, Ill. 60532. Many other similar emulsifiers are commercially available.

It has been discovered that in order to have a shortening that is both pourable at ambient temperature and provides the optimum dough improvement benefits, the amount of highly hydrogenated oil added to the base oil must be balanced against the amount of monoglyceride in the total blend. FIG. 1 shows a graph of "Percent Monoglyceride in Total Blend" versus "Percent Highly Hydrogenated Oil in Base Oil". The cross-hatched area ABCD covers the combinations of monoglyceride and highly hydrogenated oil that are acceptable to make a shortening that is both pourable and that provides optimum pizza dough improvements. The area EFGD covers preferred combinations of monoglyceride and highly hydrogenated oil. The double cross-hatched area EFGHI covers the most preferred combinations of monoglyceride and highly hydrogenated oil. In the present invention, the amounts of emulsifier and highly hydrogenated oil are chosen so that a plot of percent monoglyceride versus percent highly hydrogenated oil falls within the acceptable or preferred area in the FIG. 1 graph. The area in the graph below and to the right of the cross-hatched area covers combinations that make a shortening which is not pourable at ambient temperature. The area in the graph above the cross-hatched area covers combinations that make a shortening which does not provide adequate dough improvements.

The shortening of the invention has a solid fat index between about 3 and about 12 at 50° F., between 0 and about 7 at 70° F., between 0 and about 4 at 80° F., between 0 and about 3 at 92° F., and not more than about 3 at 104° F.. The shortening preferably has a solid fat index between about 3 and about 8 at 50° F., between 0 and about 4 at 70° F., between 0 and about 2 at 80° F., between 0 and about 2 at 92° F., and not more than about 2 at 104° F.. Solid fat index is measured by the Dilatometric Method, which is A.O.C.S. Official Method Cd 10–57 (1989). The last SFI measurement is done at 104° F. instead of 100° F. as in the Official Method. Results are expressed in units of mL/kg.

Process

The method for making the shortenings of the present invention involves preparing a melted base oil by melting and blending partially hydrogenated oil and optionally highly hydrogenated oil, and then melting an emulsifier and blending it with the melted base oil. This is usually done at temperatures above 110° F., preferably at temperatures of 120° F. to 140° F..

The resulting blend is then rapidly cooled in a first zone to a temperature between about 60° F. and about 80° F., preferably between about 65° F. and about 75° F., to partially crystallize the blend. This temperature range corresponds to a temperature at or below the nucleation point of the triglycerides in the shortening. Such cooling can be carried out in a scraped surface heat exchanger, such as a Votator unit manufactured by Chemtron, Inc. (commonly known as an A unit in shortening processing). This A unit consists of a steel shaft rotating in a tube. This tube is cooled externally by liquid ammonia, brine, or other refrigerants. The rotator shaft is fitted with scraper blades which press against the cool inner surface at high rotation speeds. The high internal pressures and chilling action induce nucleation and crystallization of the shortenings.

The time for rapid cooling is generally between about 5 seconds and about 30 seconds depending on the type of equipment used, and preferably between about 8 seconds and about 20 seconds when done using a Votator A unit.

Other cooling devices such as shell and tube heat exchangers or thin walled heat exchangers can be used if desired. Other useful scraped surface heat exchangers similar to the Votator A unit are the Thermutator (Cherry-Burrell, USA), the Perfector (Gerstenberg and Agger, Denmark), and the Kombinator (Shroeder, West Germany).

Typically the melted oil is precooled before entering the heat exchanger, preferably to a temperature not far above the nucleation point of the triglycerides. Precooling is more energy efficient. The Votator System employs a precooler before the A unit.

Next, the partially crystallized blend is worked by agitation in a second zone without additional cooling to further promote the formation of many small crystals and a liquid pourable shortening. The blend is worked in what is known in the shortening field as a working B unit (as opposed to a static B unit), preferably a picker unit. A picker unit typically consists of a large diameter tube having stator pins in the inner cylinder wall and a rotating shaft fitted with rotor pins. The combination of stator and rotor pins mechanically works the blend as it passes through the unit. Other designs such as a rotating shaft with rotor pins but a cylinder without stator pins can also be used. The rotor rotates at speeds of from about 50 to about 1000 rpm. The working B unit promotes triglyceride crystal growth within the shortening while working the shortening to form uniform crystal sizes. During the process the heat of crystallization and the work added usually cause a temperature increase of 10°–15° F. This working period requires at least about 1 minute, preferably at least about 1.5 minutes, and more preferably at least about 1.8 minutes. Crystallization approaches completion in the B unit.

Working B units are described in the following references: Applewhite, *Bailey's Industrial Oil and Fat Products*, 4th Ed., Vol. 3, p. 78 (1985); Haighton, "Blending, Chilling, and Tempering of Margarines and Shortenings", *J. Am. Oil Chemists Soc.* Vol. 53 (June, 1976), pp. 397–399; and Wiedermann, "Margarine and Margarine Oil, Formulation and Control", *J. Am. Oil Chemists Soc.* Vol. 55 (December, 1978), pp. 823–829. It is possible that a slowly agitated "tempering tank" rather than a conventional B unit might suffice for the "working by agitation" step of this invention.

The Votator System which includes an A unit and a B unit is described in U.S. Pat. No. 3,568,463, and the process of the Votator System is described in U.S. Pat. No. 3,455,700; both patents are incorporated by reference herein. Reference may be made to these patents for a complete description of the system and process.

The step of working by agitation has been found to be critical to making a liquid pourable shortening according to the present invention. B units are sometimes but not always used when making conventional liquid shortenings. We have discovered that in making the liquid shortenings of the invention containing very high emulsifier levels, the use of a B unit is required to make a shortening which will be pourable and not too solid. Agitation is believed to be critical for the right crystal particle size distribution and a stable, pourable product. Example 2 hereinbelow describes two parallel process runs, one with a B unit and the other without a B unit. The shortening made without the B unit firmed up and was not pourable after a time of only about 10 seconds.

After the B unit, the shortening is then collected in a storage tank or filled directly into desired containers, usually drums. The shortening can optionally be tempered by holding it in a quiescent state at a controlled temperature (preferably between 70° F. and 90° F.).

EXAMPLE 1

Example 1, Parts A–C, describes the preparation of a series of shortenings that lead to the discovery of the present composition for making a liquid pourable shortening containing high emulsifier levels.

Part A

A stable, uniform, but non-pourable at ambient temperature shortening is made from the following formula:

| Component | | Weight % |
|---|---|---|
| 1. Soybean oil, refined, bleached | | 67.2 |
| | | |
| | | |
| | | |
| | | |

-continued

| Component | | Weight % |
|---|---|---|
| and hydrogenated to approx. IV 107 | | |
| 2. Soybean oil, refined, bleached and hydrogenated to approx. IV 8 (hardstock) | Blend deodorized | 2.8 |
| 3. Emulsifier (mono- and diglycerides, containing 50% monoglyceride) | | 30.0 |
| | | 100.0% |

The soybean oil components and emulsifier are melted and blended together at about 129° F. This blend is pumped continuously through a scraped surface heat exchanger (freezer) at a rate of 406 pounds/hour. The freezer outlet temperature is 70° F. The product then enters a picker box, where the heat of crystallization causes the product temperature to rise to 81° F. Next, the product enters a scraped surface heat exchanger where the product temperature is raised to 95° F., and then held in a slowly agitated tempering tank for one hour before filling product into sample jars.

The shortening product contains 15% monoglyceride in the total blend, and 4% highly hydrogenated oil as a percentage of the so base oil. Samples held at 70° F. overnight firm up and are not pourable. Product held at 90° F. overnight remains fluid but firms up upon return to ambient (room) temperature. This product does not meet the requirements of a uniform, pourable liquid shortening at ambient temperatures.

Part B

The following formula is prepared.

| Component | | Weight % |
|---|---|---|
| 1. Soybean oil, refined, bleached and hydrogenated to approx. IV 107 | | 68.32 |
| 2. Soybean oil, refined, bleached and hydrogenated to approx. IV 8 (hardstock) | Blend deodorized | 1.68 |
| 3. Emulsifier (mono- and diglycerides, containing 50% monoglyceride) | | 30.00 |
| | | 100.00% |

The melted and blended formulation is processed in the same manner and under essentially the same conditions as described in Part A. The shortening contains 15% monoglyceride in the total blend, and 2.4% highly hydrogenated oil as a percentage of the base oil. The physical properties (pourability) are similar to those in Part A and are judged not quite acceptable.

Part C

The product from Part B is melted and diluted with melted soybean oil IV 107 in the following manner to achieve lower levels of monoglyceride and highly hydrogenated oil.

| Component | Weight % |
|---|---|
| 1. Shortening from Part B | 80.0 |
| 2. Soybean oil, refined, bleached, hydrogenated to approx. IV 107, and deodorized | 20.0 |
| | 100.0% |

The melted and blended formulation is processed in the same so manner and under essentially the same conditions as described in Part A. The shortening product contains 12% monoglyceride in the total blend, and 1.8% highly hydrogenated oil as a percentage of the base oil. The product is uniform, stable, and pourable at ambient temperature. The product is functional in the intended pizza dough application and thus satisfies all of the desired qualities of this product.

EXAMPLE 2

This example describes the best mode of the present invention, a successful commercial or plant-size production run. An unsuccessful production run is also described which illustrates the necessity of using a B unit in the process of the present invention. The following composition is formulated.

| | Component | Weight, lbs. | Weight % |
|---|---|---|---|
| 1. | Soybean oil, refined, bleached, hydrogenated to approx. IV 107, and deodorized | 44,798 | 73.68 |
| 2. | Emulsifier (mono- and diglycerides, containing 49.4% monoglycerides) | 16,000 | 26.32 |
| | | | 100.00% |

The soybean oil and emulsifier are melted and blended together at a temperature between 130° F. and 140° F. The melted and blended formulation is initially processed continuously through two parallel Votator Systems (see U.S. Pat. No. 3,568,463), each at a nominal rate of 10,000 lbs/hour. The melted blend at 130° F. to 140° F. is pumped through a precooler where it is cooled to about 115° F. and then split into two parallel streams. In one stream, the product flows through a scraped surface heat exchanger (Votator A unit) where it is rapidly chilled to about 73° F. over a time of about 9½ seconds. The product continues to flow through a Votator B unit where it is worked by agitation for about 1.9 minutes, and the temperature rises to between about 80°-84° F. The shortening then flows into a storage tank. The second stream also flows through a Votator A unit and is chilled to about 73° F. over about 9½ seconds. In contrast to the first freezing system, this second freezing system is not provided with a Votator B unit. It is observed that product leaving the B unit in the first stream is uniform and pourable and remains so, while product sampled from the second system without a B unit is uniform and pourable initially, but after a time of only about 10 seconds the product firms up so that a cup containing the product can be turned upside down and no product will flow out. This lack of pourability is undesirable, so that it is concluded that some degree of agitation during crystallization after rapid cooling in the freezer is required.

Product processed only through the freezing system containing the B unit is collected in a storage tank until the entire batch is processed. The uniform, pourable product is then packed into drums. It is believed that the product may also be packed directly into containers such as drums without collecting the entire batch in a storage tank. This alternate pack out has been accomplished in later runs.

The measured solid fat index of the liquid pourable shortening is approximately 4 at 50° F., 1 at 70° F., 0 at 80° F., 0 at 92° F., and 0 at 104° F.

What is claimed is:

1. A process for making a uniform liquid, pourable shortening containing high emulsifier levels comprising:
   (a) preparing a melted base oil comprising between about 96% and 100% melted partially hydrogenated edible oil having an iodine value between about 90 and 133, and between 0% and about 4% melted highly hydrogenated edible oil having an iodine value of not more than about 8; then
   (b) blending a melted emulsifier containing at least about 30% monoglyceride with the melted base oil in proportions so that the monoglyceride content of the total blend is between about 12% and about 16%:
   (c) wherein the amounts of emulsifier and highly hydrogenated oil are chosen so that a plot of percent monoglyceride versus percent highly hydrogenated oil falls within the cross-hatched area EFGD in FIG. 1; then
   (d) in a first zone, rapidly cooling the melted total blend to a temperature between about 60° F. and about 80° F. to partially crystallize the blend; and then
   (e) in a second zone, working by agitation for a time of at least about 1 minute the partially crystallized total blend to form a liquid pourable shortening:
   wherein the product shortening has a solid fat index between about 3 and about 12 at 50° F., between 0 and about 7 at 70° F., between 0 and about 4 at 80° F., between 0 and about 3 at 92° F., and not more than about 3 at 104° F.

2. A process according to claim 1 wherein the amounts of emulsifier and highly hydrogenated oil are chosen so that a plot of percent monoglyceride versus percent highly hydrogenated oil falls within the double cross-hatched area EFGHI in FIG. 1.

3. A process according to claim 1 wherein the base oil comprises between about 97.5% and 100% partially hydrogenated oil and between 0% and about 2.5% highly hydrogenated oil.

4. A process according to claim 3 wherein the base oil comprises 100% partially hydrogenated oil and 0% highly hydrogenated oil.

5. A process according to claim 1 wherein the iodine value of the partially hydrogenated edible oil is between about 98 and about 120.

6. A process according to claim 5 wherein the iodine value of the partially hydrogenated edible oil is between about 100 and about 115.

7. A process according to claim 1 wherein the monoglyceride content of the total blend is between about 12% and about 14%.

8. A process according to claim 7 wherein the monoglyceride content of the total blend is about 13%.

9. A process according to claim 1 wherein the emulsifier is a mono-diglyceride containing between about 30% and about 70% monoglyceride.

10. A process according to claim 9 wherein the emulsifier is a mono-diglyceride containing between about 40% and about 60% monoglyceride, and between about 32% and about 52% diglyceride.

11. A process according to claim 10 wherein the emulsifier is a mono-diglyceride containing about 50% monoglyceride, about 42% diglyceride, and about 8% triglyceride.

12. A process according to claim 11 wherein the total blend contains between about 68% and about 80% base oil and between about 20% and about 32% mono-diglyceride emulsifier.

13. A process according to claim 12 wherein the total blend contains between about 72% and about 76% base oil and between about 24% and about 28% mono-diglyceride emulsifier.

14. A process according to claim 1 wherein the emulsifier has an iodine value between about 60 and about 85.

15. A process according to claim 1 wherein the highly hydrogenated edible oil is soybean oil.

16. A process according to claim 1 wherein the partially hydrogenated edible oil is selected from the group consisting of soybean oil, corn oil, cottonseed oil, canola oil, sunflower oil, and mixtures thereof.

17. A process according to claim 16 wherein the partially hydrogenated edible oil is soybean oil.

18. A process according to claim 1 wherein the product shortening has a solid fat index between about 3 and about 8 at 50° F., between 0 and about 4 at 70° F., between 0 and about 2 at 80° F., between 0 and about 2 at 92° F., and not more than about 2 at 104° F.

19. A process according to claim 1 wherein the melted blend in step (d) is rapidly cooled to a temperature between about 65° F. and about 75° F.

20. A process according to claim 1 wherein the cooling and partial crystallization of step (d) is done in a scraped surface heat exchanger.

21. A process according to claim 1 wherein the working by agitation in step (e) is done in a picker unit.

* * * * *